United States Patent [19]

Kausträter

[11] 4,336,744
[45] Jun. 29, 1982

[54] ARMORED VEHICLE

[75] Inventor: Gert Kausträter, Augsburg, Fed. Rep. of Germany

[73] Assignee: Industrie-Werke Karlsruhe Augsburg Aktiengesellschaft, Fed. Rep. of Germany

[21] Appl. No.: 97,647

[22] Filed: Nov. 27, 1979

[30] Foreign Application Priority Data

Nov. 29, 1978 [DE] Fed. Rep. of Germany ....... 2851604

[51] Int. Cl.³ .............................................. F41H 7/02
[52] U.S. Cl. ..................................... 89/40 K; 340/687
[58] Field of Search .................. 89/36 H, 36 K, 37 H, 89/40 B, 40 K; 340/540, 679, 687

[56] References Cited

U.S. PATENT DOCUMENTS

| | | | |
|---|---|---|---|
| 662,761 | 11/1900 | Bowman et al. | 89/36 H |
| 3,424,052 | 1/1969 | Ruf | 89/40 B |
| 3,626,367 | 12/1971 | Eppley | 340/540 |

Primary Examiner—Stephen C. Bentley
Attorney, Agent, or Firm—Jenkins, Coffey, Hyland, Badger & Conard

[57] ABSTRACT

An armored vehicle having a full-circle swivelable turret and a weapon which outside the turret is elevationally aimable on a weapon support connected to the turret includes a mechanism for selectively securing, releasing, and partially releasing the weapon support exclusively from the turret interior and for triggering a signal when the weapon support is secured. When the weapon support is secured the weapon is maintained in a fixed position, and when the weapon support is released the weapon can be moved into any firing position. The mechanism allows personnel to remain inside the armored protection when securing and releasing the weapon support.

12 Claims, 5 Drawing Figures

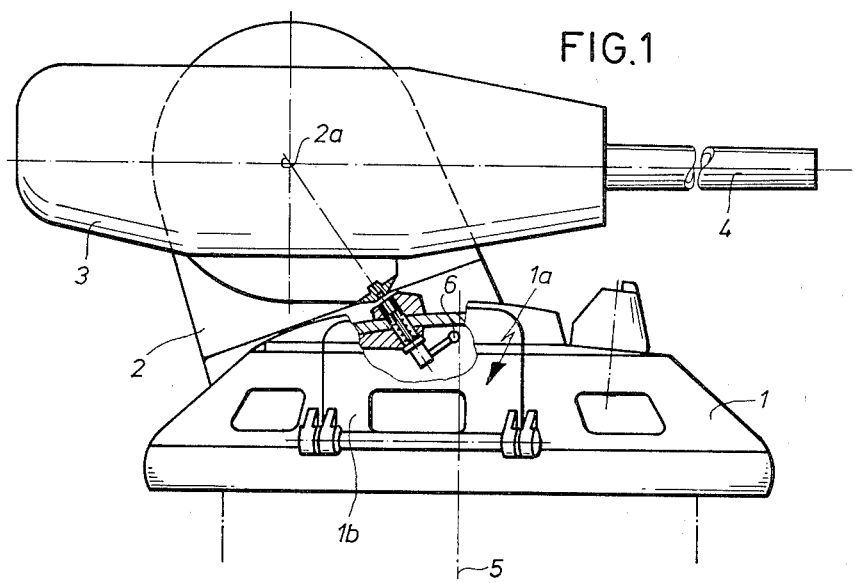
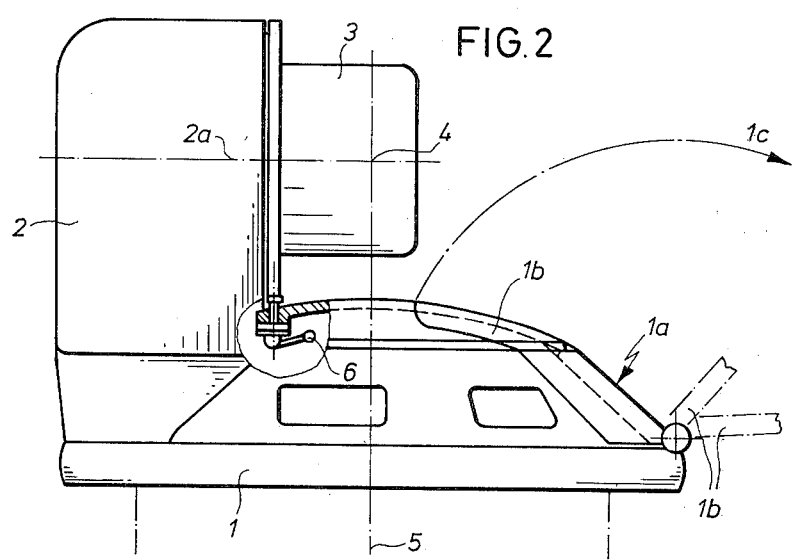

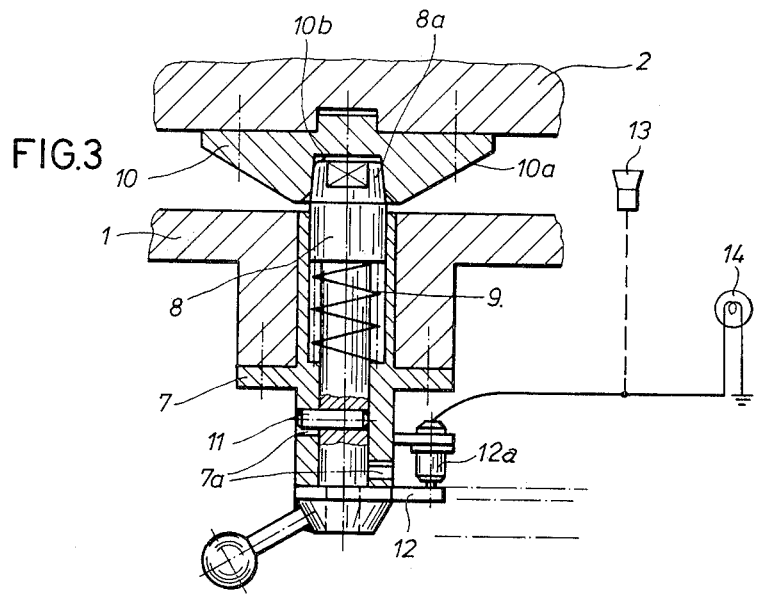
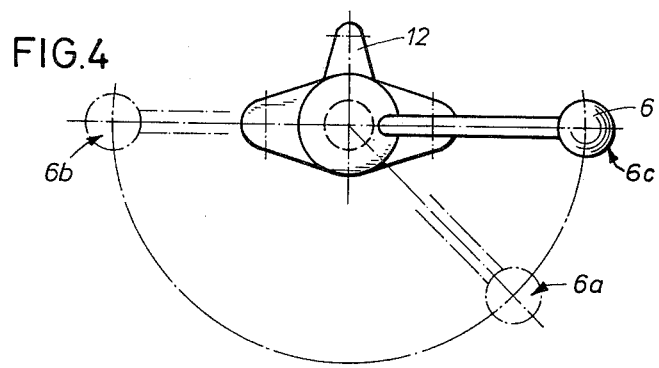
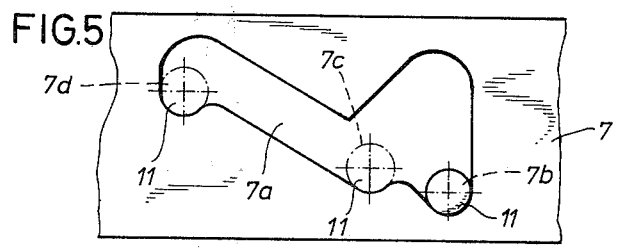

ARMORED VEHICLE

The invention concerns an armored wheel, half-track or full-track vehicle with a turret permitting a full-circle rotation and with a rapid-fire gun which outside the turret permits elevational aiming on a specific weapon support which constructionally is connected with the turret and interacts with mechanical means with the aid of which it can be fixed together with the weapon selectively in its zero position ("tied position") or can be moved upon release of the mechanical means ("untied position") into any firing position.

Irrespective of the combat case, armored wheel, half-track and full-track vehicles are already for terrain-related reasons subjected to considerable mechanical stress. Such stress requires, e.g., a safe-storage of the ammunition for the on-board weapons in the vehicle interior.

This applies similarly also to the on-board weapon(s), specifically the rapid-fire gun of the vehicle: It requires both off the road and on the road a careful and safe securing in its zero or "tied position". On the other hand, however, for instance in cases of impending weapon use, having the gun ready for firing within the shortest possible time must be assured. In turn, this makes it necessary to eliminate as quickly as possible the securing of the weapon in its zero or "tied position".

On prior vehicles of the said category, relatively simple mechanical means are used for fixing or releasing the weapon support. While these fulfill as such the contemplated function, they are associated with a considerable shortcoming which is constituted in that due to their arrangement on the outside of the vehicle and/or turret they can only from there be rendered functional or nonfunctional. For that purpose it is necessary for a crew member to avail himself outside the armor protection provided by the vehicle and/or turret. Obviously, this requirement makes the loss of personnel practically inevitable, for instance under enemy hand weapon fire or similar. In turn, the loss of personnel results in a reduction of combat value of the vehicle.

In the light of the shortcomings and disadvantages pointed out so far, the objective of the present invention is to design and/or advance the "tying" or "untying device", known as such for the weapon support, in the sense of a distinct increase of the combat value of the vehicle in a fashion such that the crew member operating such a device must no longer leave the armor protection provided by the vehicle and/or the turret, whereby the loss of personnel is avoided at a high degree of probability.

According to the inventional suggestion, this problem is solved in that the mechanical means consist essentially of a forced control which effects the securing, release or partial release of the weapon support exclusively from the turret interior and which, at least in the securing position, triggers automatically an acoustic and/or optical signal.

In a favorable embodiment of the idea underlying the suggested invention, the forced control consists of a turret-fixed gate type guide whose cam, provided with defined lock-in positions, permits the movement of a switching facility from the securing position through the partial release position into the released position (or conversely).

Further relevant inventional characteristics, especially such concerning the structural and design embodiment of the mechanical means, derive from the claims 3-5 and the description and drawing.

It is readily perceivable and likewise convincing that the proposed invention is accomplished by considerable advantages.

Owing to the arrangement of the operating means serving the securing or (partial and/or) release of the weapon support under armor protection as well as the arrangement of acoustic and/or optical means for indication of the weapon support combat condition and/or readiness it is no longer necessary for a crew member to place himself outside the armor protection in order to establish the combat readiness of the on-board weapon. Avoided thereby are personnel losses in the sense of a genuine increase of combat value.

An embodiment of the invention is illustrated in the drawing, which shows in

FIG. 1, the turret of an armored vehicle—not illustrated in detail—with weapon support and rapid-fire gun in side elevation;

FIG. 2, a turret arrangement according to FIG. 1, from the rear, that is, in motive direction;

FIG. 3, a vertical section of the device serving the securing or release of the weapon support;

FIG. 4, a schematic illustration of the switching positions of the device according to FIG. 3, and lastly FIG. 5, a gate type guide with defined lock-in positions, as a forced control.

The turret 1 is arranged in customary, turnable fashion on a wheel, half-track or full-track vehicle which is otherwise not illustrated. Permanently connected with the turret 1 is the weapon standard 2. At point 2a, the on-board weapon arranged within the weapon support 3, for instance an automatic gun 4, is mounted in a fashion permitting elevational aiming. To home in on a target, the sideways aiming of the weapon thus takes place by swiveling the turret on its vertical axis 5. Elevationally, the weapon 4 is trained by swiveling the weapon support 3, which is mounted in turnable fashion on the weapon standard 2, on the horizontal axis 2a. A hatch 1a which in the direction of travel is arranged on the side opposite the weapon standards 2 can be sealed by means of a hatch cover 1b, the opening radius of which is symbolized by arrow 1c (FIG. 2).

Part of the mechanical means serving the securing, release or partial release of the weapon support 3 consists essentially of an operator 6, sleeve 7, bolt 8 and a helical spring 9. These means are arranged in the turret 1, while the corresponding means necessary for the function of this device, and at that, specifically the tie bar 10 provided with inclined run-on surfaces 10a, are installed on the weapon support 3.

Transverse to the longitudinal axis, the bolt 8 is provided with an indexing pin 11 which, in turn, is guided positively in the gate type guide 7a of bushing 7. In FIGS. 4 and 5, the operator 6 is illustrated with the indexing pin 11 in its three defined lock-in positions, with the positions 6c and 7b which are identical relative to each other serving the securing ("tying"), the positions 6a and 7c the partial release ("partial untying") and, lastly, the positions 6b and 7b the release ("untying") of the bolt 8 which on its lower end 8a has a slightly conic design and is arranged in a recess 10b of corresponding design and in the tie bar 10.

Provided in axial direction between the switching operator 6 and the bolt 8 is an arm type slide 12 which after and/or during movement of the operator into the securing position will actuate a switch 12a. Released by this actuation is an acoustic and/or optical signal 13, 14 which indicates to the tank commander and/or the gunner that the weapon support 3 with the weapon 4 installed within it is mechanically secured ("tied"). Conversely, when the acoustic signal ceases and/or the optical indication extinguishes, the operating personnel can recognize that the mechanical blocking between turret 1 and weapon support 3 has been eliminated and/or is in an indifferent "partial release" position.

Underlying the blocking device which in comparison to other, prior solutions is operable exclusively from the vehicle and/or turret interior is the following mode of operation:

For certain combat-related, technical and/or terrain-related reasons it is necessary to fix the weapon support 3 and the weapon 4 relative to the turret 1. In such case, the switching operator 6 is in the position illustrated in FIG. 4. Mounted in the bolt 8, the index pin 11 is located likewise within the gate 7a in a defined engagement position 7b (FIG. 5). The bolt 8 engages in this position with its slightly conic end 8a on the far side of the switching operator 6 the recess 10b of the blocking bar 10. The helical spring 9 surrounding the bolt 8 concentrically retains it in the recess 10b.

If it becomes necessary, for instance for combat-related reasons, to render the weapon ready for combat, the operator 6 is moved through the intermediary of the indexing pin 11 connected with it to the position 7d (FIG. 5). The slightly conic part 8a of the bolt 8 disengages thereby the recess 10b in the blocking bar 10.

Upon movement of the operator 6 either from the blocking or, however, from the release position to the indifferent partial release position 7c (FIG. 5) the bolt 8 rises through the intermediary of the index pin 11 which is guided within the gate 7a beyond the turret 1 an amount such that it can without difficulties run on one of the inclined run-on surfaces 10a of the blocking bar 10 during a movement of the weapon support 3.

The use of the device described above in detail both with regard to structure and operating mode guarantees in the sense of a genuine combat value increase an uncomplicated operation under armor protection while the movements take place outside the turret.

I claim:

1. In an armored vehicle with a full-circle swivelable turret and with a rapid-fire gun which outside the turret is elevationally aimable on a specific weapon carrier which is constructionally connected with the turret and interacts with mechanical means by which it can together with the weapon be selectively blocked in its zero position ("tied position") or, upon release of the mechanical means ("untied position"), moved into any firing position, the improvement wherein the mechanical means consist essentially of a forced control (6, 7a, 11) which effects the blocking, release and partial release of the weapon support (3) exclusively from the turret interior and which triggers, at least in the blocked position, automatically at least one signalling means (13, 14), the forced control including a gate type guide (7a) having cam surfaces defining lock-in positions (7b, 7c, 7d) which permit movement of an operator (6) from a blocking position (7b) through a partially released position (7c) to a position of release (7d) and vice versa.

2. Vehicle according to claim 1, characterized in that the operator (6) is connected with a bolt (8) which, for one, has an axial guideway in a turret-fixed bushing (7) and, for another, features an index pin (11) which is arranged transverse to the longitudinal axis of the bolt and which follows the cam surfaces located in the bushing (7).

3. Vehicle according to claim 2, characterized in that the bolt (8) is on its end (8a) on the far side of the operator (6) slightly conic, which bolt is in the blocking position (7b) retained in a recess (10b) corresponding to it, by means of a helical spring (9) acting on a shoulder of the bolt (8), surrounding it concentrically and bearing on the inside of the bushing (7), with the recess (10b) being located in a weapon support-fixed (2) blocking bar (10) which is provided with inclined run-on surfaces (10a).

4. Vehicle according to claims 1 or 2, characterized in that between the operator (6) and the bolts (8) there is an arm type slide (12) arranged which at least after movement of the operator (6) into the blocking position (7b) actuates a switch (13) which triggers the signalling means (13, 14).

5. In an armored vehicle of the type having a swivelable turret, a weapon support connected to the turret, a weapon carried by the weapon support which is elevationally aimable on the weapon support outside the turret and means for selectively securing and releasing the weapon support for movement of the weapon into a firing position, the improvement wherein the means for securing and releasing the weapon support comprises a control which effects the securing, release, and partial release of the weapon support exclusively from the turret interior and which, at least in the securing position, automatically triggers an indicating signal, the control includes an operator, a gate having cam surfaces defining lock-in positions which permit movement of the operator from a securing position through a partially released position to a release position and vice versa, a bolt provided in an axial guideway formed by a bushing fixed to the turret, the operator being connected to the bolt, the bolt includes an index pin which is positioned transverse to the longitudinal axis of the bolt and which follows the cam surfaces of the gate, the gate also being formed by the bushing.

6. The apparatus as recited in claim 2 wherein the bolt is slightly conic at an end opposed to the operator, the slightly conic end of the bolt being retained by a spring in a recess of a corresponding shape in a blocking bar fixed in the weapon support.

7. The apparatus as recited in claim 6 wherein the spring acts on the shoulder of the bolt and bears on the inside of the bushing to retain the conic end of the bolt in the recess of the blocking bar and the blocking bar is provided with running surfaces for engaging the turret.

8. The apparatus as recited in claim 5, further comprising an arm provided between the operator and the bolt, which in response to movement of the operator into a position securing the weapon support, activates an acoustic and optical signal.

9. An apparatus for securing and releasing a weapon support of an armored vehicle from inside the turret of the vehicle, comprising a bushing fixed in the turret and forming a guideway communicating with the exterior and interior of the turret, a shaft axially received in the guideway having one end exterior to the turret which is slightly conic, an operator connected to another end of the shaft interior to the turret for rotating the shaft within the guideway, a bar fixed to the weapon support having a recess for receiving the conic end of the shaft, and an index pin positioned transverse to the longitudinal axis of the shaft, the bushing including a gate having cam surfaces defining a plurality of lock-in positions which are followed by the index pin in response to movement of the operator to secure and release the weapon support.

10. The apparatus as recited in claim 9, further including means for retaining the conic end of the shaft in the recess of the bar when the operator is locked in the securing position of the gate.

11. The apparatus as recited in claim 10, further including a movable arm responsive to movement of the operator, activates an indicator to signal when the weapon support is secured.

12. The apparatus as recited in claim 11 wherein the bar fixed to the weapon support includes running surfaces for engaging the turret when the weapon support is released.

* * * * *

UNITED STATES PATENT AND TRADEMARK OFFICE
CERTIFICATE OF CORRECTION

PATENT NO. : 4,336,744

DATED : June 29, 1982

INVENTOR(S) : Gert Kaustrater

It is certified that error appears in the above-identified patent and that said Letters Patent is hereby corrected as shown below:

Column 2, line 4, change "accomplished" to --accompanied--.

Column 4, line 41 (claim 6), change "claim 2" to --claim 5--.

Signed and Sealed this

Fourteenth Day of September 1982

[SEAL]

Attest:

GERALD J. MOSSINGHOFF

Attesting Officer   Commissioner of Patents and Trademarks